(12) United States Patent
Ngah et al.

(10) Patent No.: US 9,491,798 B2
(45) Date of Patent: Nov. 8, 2016

(54) COMMUNICATIONS SYSTEM

(71) Applicant: Telekom Malaysia Berhad, Kuala Lumpur (MY)

(72) Inventors: Nor Azhadi Ngah, Selangor Darul Ehsan (MY); Nurul Afzan Omar, Selangor Darul Ehsan (MY); Mohamed Razman Yahya, Selangor Darul Ehsan (MY); Norman Fadhil Idham Muhammad, Selangor Darul Ehsan (MY); Ashaari Yusoff, Selangor Darul Ehsan (MY); Asban Dolah, Selangor Darul Ehsan (MY); Syamsuri Yaakob, Kuala Lumpur (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 593 days.

(21) Appl. No.: 13/721,550

(22) Filed: Dec. 20, 2012

(65) Prior Publication Data
US 2013/0170827 A1 Jul. 4, 2013

(30) Foreign Application Priority Data
Dec. 28, 2011 (MY) .............................. PI2011006302

(51) Int. Cl.
H04W 88/08 (2009.01)
H04W 84/10 (2009.01)

(52) U.S. Cl.
CPC ............. *H04W 88/08* (2013.01); *H04W 84/10* (2013.01)

(58) Field of Classification Search
USPC ................................... 455/561; 398/25, 115
See application file for complete search history.

(56) References Cited

U.S. PATENT DOCUMENTS

| | | | |
|---|---|---|---|
| 5,107,637 A * | 4/1992 | Robbins ............... | E04H 1/1211 136/291 |
| 2004/0088104 A1* | 5/2004 | Izbicki .................. | G08G 1/123 701/117 |
| 2004/0233877 A1* | 11/2004 | Lee et al. ....................... | 370/338 |
| 2005/0043885 A1* | 2/2005 | Amlinger ............ | G08B 25/014 701/465 |
| 2005/0137754 A1* | 6/2005 | Bartlett .............................. | 701/1 |
| 2005/0254818 A1* | 11/2005 | Zhou et al. ..................... | 398/43 |
| 2005/0259668 A1* | 11/2005 | Kim ............................... | 370/401 |
| 2007/0179689 A1* | 8/2007 | Soulie et al. ................... | 701/19 |
| 2007/0257796 A1* | 11/2007 | Easton et al. .............. | 340/572.1 |
| 2007/0292142 A1* | 12/2007 | Hashimoto ...... | H04B 10/25758 398/186 |
| 2008/0080863 A1* | 4/2008 | Sauer et al. ..................... | 398/70 |
| 2008/0095127 A1* | 4/2008 | Taki ............................... | 370/338 |
| 2008/0117863 A1* | 5/2008 | Cotton et al. ................. | 370/328 |
| 2008/0119136 A1* | 5/2008 | Khazi .......................... | 455/41.2 |
| 2008/0227403 A1* | 9/2008 | Taki ............................... | 455/68 |
| 2009/0089149 A1* | 4/2009 | Lerner et al. ................... | 705/10 |
| 2010/0189439 A1* | 7/2010 | Novak et al. ................... | 398/67 |
| 2010/0263001 A1* | 10/2010 | Nippa ..................... | H04B 1/04 725/67 |
| 2011/0006922 A1* | 1/2011 | Tsuboi et al. ................. | 340/994 |
| 2011/0029361 A1* | 2/2011 | Deleon ........................ | 705/14.4 |

(Continued)

*Primary Examiner* — Erica Fleming-Hall
(74) *Attorney, Agent, or Firm* — Jacobson Holman, PLLC.

(57) ABSTRACT

There is provided a communications system (10) comprising a plurality of base stations (12), a central station (16) and a fiber optic communications network (14). Each base station (12) comprises a shelter (20) for a passenger awaiting transport, the shelter (20) having a wireless network access point (22). The central station (16) is arranged to facilitate communication between each base station (12) and a communications network (18) and the fiber optic communications network (14) is arranged to facilitate communication between each base station (12) and the central station (16).

10 Claims, 6 Drawing Sheets

(56) References Cited

U.S. PATENT DOCUMENTS

| | | | |
|---|---|---|---|
| 2011/0298697 A1* | 12/2011 | Fujimori | G09F 9/35 345/102 |
| 2011/0298841 A1* | 12/2011 | Fujimori | 345/690 |
| 2012/0134666 A1* | 5/2012 | Casterline et al. | 398/22 |
| 2012/0134673 A1* | 5/2012 | Palanisamy et al. | 398/58 |
| 2012/0170560 A1* | 7/2012 | Han et al. | 370/338 |
| 2013/0022031 A1* | 1/2013 | Sivertsen | 370/338 |
| 2013/0076269 A1* | 3/2013 | Shilton | F21L 4/08 315/360 |
| 2014/0080406 A1* | 3/2014 | Freitas et al. | 455/7 |
| 2014/0277863 A1* | 9/2014 | Landes | 701/19 |

* cited by examiner

COMMUNICATIONS SYSTEM

This application claims the priority of Malaysian no. PI 2011006302 filed Dec. 28, 2011, hereby incorporated by reference.

FIELD OF THE INVENTION

The present invention relates to a communications system.

BACKGROUND OF THE INVENTION

Passengers awaiting transport, such as at a bus shelter, generally do not have access to infrastructure that would allow them to access online services such as email, online banking, shopping and entertainment and news services. Instead, waiting passengers will generally be required to use relatively expensive mobile broadband services.

There is therefore a need for technological advancement.

SUMMARY OF THE INVENTION

In accordance with a first aspect of the present invention, there is provided a communications system comprising:
   a plurality of base stations, each base station comprising a shelter for a passenger awaiting transport, the shelter having a wireless network access point;
   a central station arranged to facilitate communication between each base station and a communications network; and
   a fibre optic communications network arranged to facilitate communication between each base station and the central station.

In one embodiment, the wireless network access points are radio frequency network access points. In one particular example, the radio frequency network access points are millimeter wave radio frequency network access points.

The fibre optic communications network is typically arranged to facilitate radio over fibre (RoF) communications between each base station and the central station.

In one example, the fibre optic communications network comprises a splitter system arranged between the base stations and the central station, the splitter system being arranged to facilitate communications between respective optical fibre links that connect respective base stations to the splitter system and at least one optical fibre link that connects the splitter system to the central station.

In one embodiment, the fibre optic communications network comprises at least one fibre optic distribution system arranged between the splitter and a plurality of base stations, the fibre optic distribution system being arranged to facilitate communications between the plurality of base stations and the splitter system.

The communications network may be the Internet, however it will be appreciated that the communication network may be any other appropriate network such as an intranet or other local area network.

In one embodiment at least some of the base stations are arranged along at least a portion of a transportation route. In this way, passengers who transit along the transportation route are able to use the communications system at different points of the transportation route. In one example, a wireless range provided by each wireless network access point is sufficient so as to provide substantially continuous network coverage over at least a portion of the transportation route.

In one embodiment, the shelter of at least one base station comprises:
   a roof portion;
   photovoltaic cells disposed on the roof portion, the photovoltaic cells being arranged to convert solar energy into electrical energy; and
   an energy distribution system arranged to receive electrical energy from the photovoltaic cells and to provide the electrical energy to at least one electrically powered component of the base station;
   wherein the base station is arranged such that the wireless network access point is powered by the energy distribution system.

The at least one base station may comprise at least one of the following electrically powered components:
   a lighting system;
   a display system;
   an audio system; and
   a security system.

The at least one base station may comprise a battery system arranged to store electrical energy converted by the photovoltaic cells. The at least one base station may be arranged such that the electrically powered components of the at least one base station can receive stored electrical energy from the battery system, for example at times when sunlight is not impinging on the photovoltaic cells.

The lighting system may comprise at least one LED light. In this way, the energy consumption of the lighting system will typically be lower than one that uses more traditional lights, allowing for more efficient use of the energy distribution system.

The at least one base station may be arranged to detect an amount of ambient light and to turn the lighting system on if the amount of detected ambient light is below a predetermined threshold. In one embodiment the at least one base station comprises a light detector wherein the amount of ambient light is detected using the light detector. In another embodiment, the amount of ambient light is detected by measuring an output of the photovoltaic cells. In this embodiment, the at least one base station is arranged such that, if the output of the photovoltaic cells is below a predetermined threshold, the lighting system is turned on.

The display system and/or the audio system may be arranged to provide information or services such as advertising or entertainment to users of the shelter. The display system and the audio system may operate separately or in conjunction with one another to provide the information or services. Content output by the display and/or audio systems may be provided by the communications system.

The security system may comprise an appropriate security monitoring system such as a closed circuit television system or a security system that uses Internet protocol (IP) cameras. The security system may be arranged to provide security video to security and/or law enforcement personnel. In one embodiment, the at least one base station is arranged to provide the security video to the security and/or law enforcement personnel via the communications system.

BRIEF DESCRIPTION OF THE DRAWINGS

In order that the present invention may be more clearly ascertained, embodiments of the present invention will now be described, by way of example only, with reference to the accompanying drawings, in which:

FIG. 4b is a front view of the base station of FIG. 1a;

FIG. 4c is a side view of the base station of FIG. 1a; and

DESCRIPTION OF AN EMBODIMENT OF THE INVENTION

Figure 1:
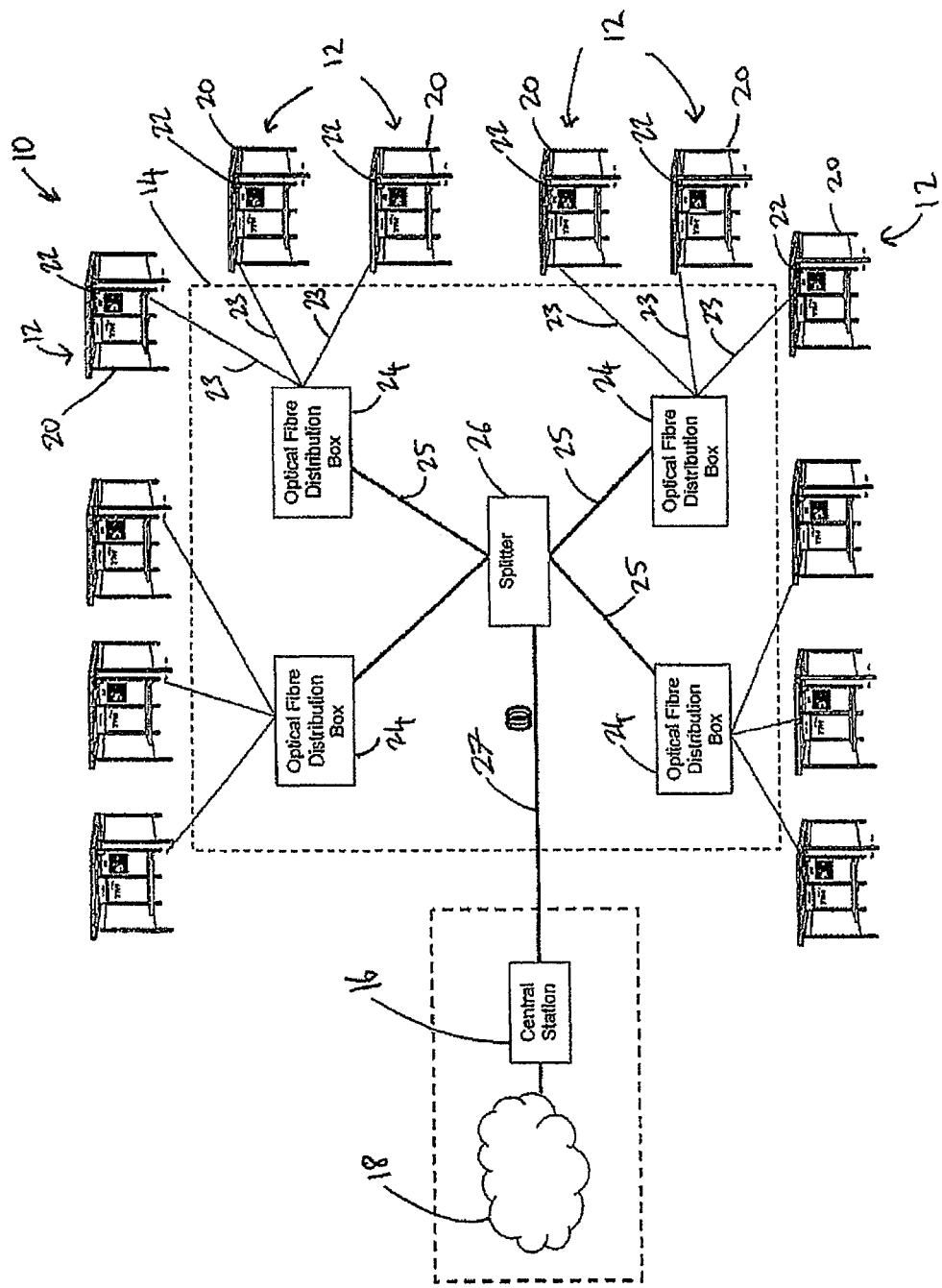
FIG. 1 is a schematic diagram of a communications system in accordance with an embodiment of the present invention.

FIG. 1 shows a communications system 10. The communications system 10 comprises a plurality of base stations 12 connected via a fibre optic communications network 14 to a central station 16. The central station is in communication with a network 18. In this example the network 18 is the Internet although it will be appreciated that the network 18 may be any appropriate network such as an intranet or other local area network.

Each base station 12 is a shelter 20 for passengers awaiting transport. In this example, the shelters 20 are bus shelters, although it will be appreciated that the shelters 20 may be train shelters, tram shelters, taxi shelters or any other appropriate passenger shelters. It will also be appreciated that the shelters 20 may be a combination of different types of shelters.

Each shelter 20 comprises a wireless network access point 22. The wireless network access points 22 are accessible by passengers awaiting transport and, in conjunction with the rest of the communications system 10, allow the waiting passengers to access the network 18.

A plurality of wireless network access points 22 of respective shelters 20 are connected via fibre optic links 23 to a respective optical fibre distribution box 24. In this example, three wireless network access points 22 are connected to a single optical fibre distribution box 24 via respective optical fibre links 23. There are four optical fibre distribution boxes 24, each servicing three respective wireless access points 22 to provide for a total of twelve wireless access points 22 in this particular communications network 10.

It will be appreciated that the amount of wireless network access points 22 and optical fibre distribution boxes are purely illustrative, and any appropriate arrangement or amount of these components of the communications system 10 are envisaged.

Each optical fibre distribution box 24 is in turn connected, via a respective fibre optic link 25, to a splitter system 26. The splitter system 26 is arranged to facilitate communications between the fibre distribution boxes 24 with the central station via an optical fibre link 27.

In this example, the wireless network access points 22 are radio frequency network access points, particularly millimeter wave radio frequency network access points.

The fibre optic communications network 14 is therefore arranged to facilitate radio over fibre (RoF) communications between each base station 12 and the central station 16.

In this example, wherein the base stations 12 are bus shelters 20, at least some of the bus shelters 20 may be arranged along at least a portion of a bus route. In this way, passengers who transit along the bus route are able to use the same communications system 10 at different points of the bus route, for example while they are waiting for the bus, and when they disembark from the bus. For some embodiments, a wireless range provided by each wireless network access point 22 may be sufficient so as to provide substantially continuous network coverage over at least a portion of the bus route.

Figure 2:
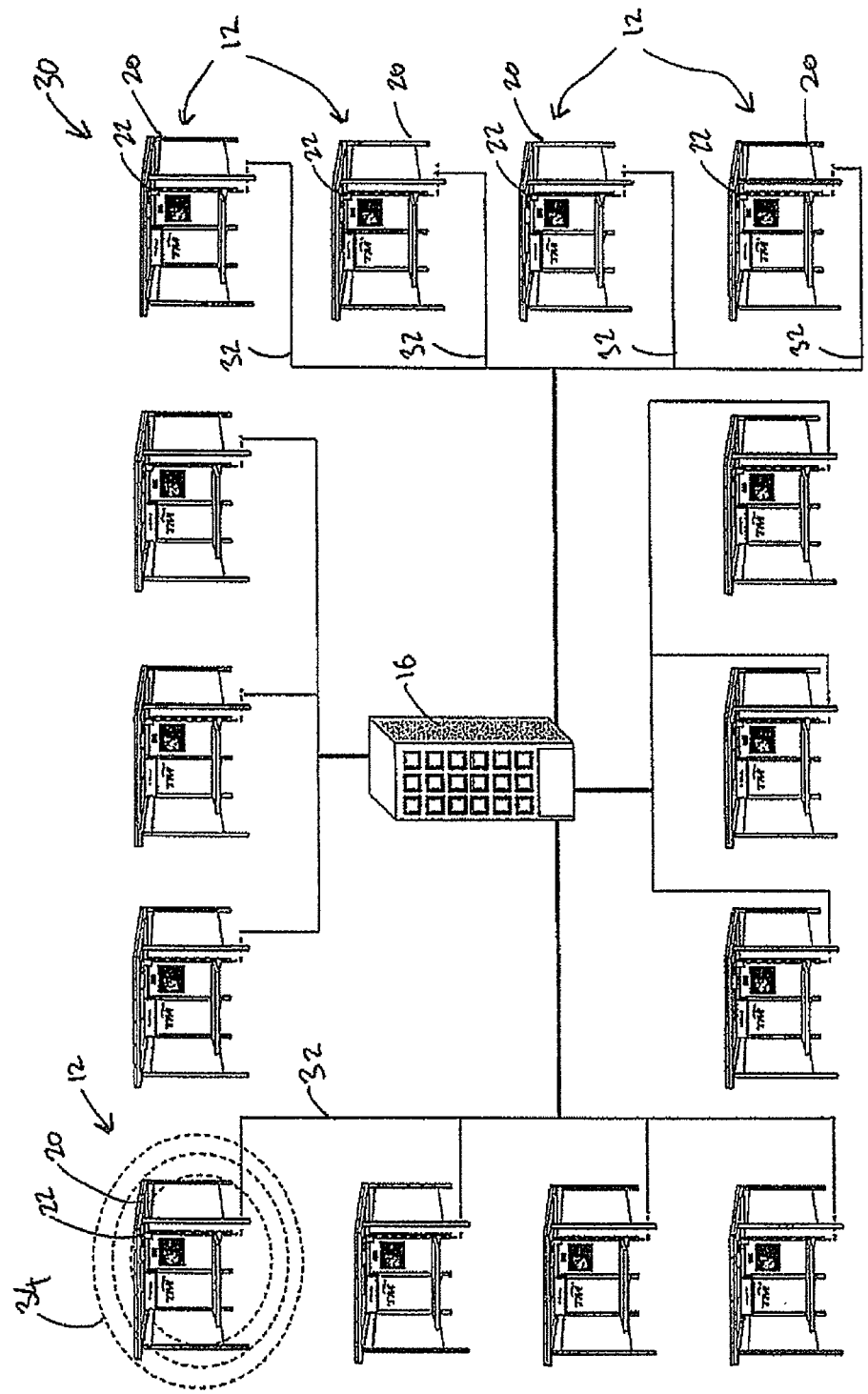
FIG. 2 is a schematic diagram of a communications system in accordance with a further embodiment of the present invention.

FIG. 2 shows another example communications system 30. The communications system 30 has some similar components to the communications system 10 and comprises a plurality of base stations 12 having wireless network access points 22 in communication with a central station 16. The central station 16 is in turn connected to a network (not shown). The communications system 30 comprises direct optical links 32 between each base station 12 and the central station 16. FIG. 2 also illustrates a wireless network access region 34 surrounding one of the base stations 12. The wireless network access region 34 is provided by a respective wireless network access point 22 of the base station 12.

Components of the communications system 10, 30 that allow for communication between the base stations 12 and the central station 16 will now be described in more detail with reference to FIG. 3.

Figure 3:
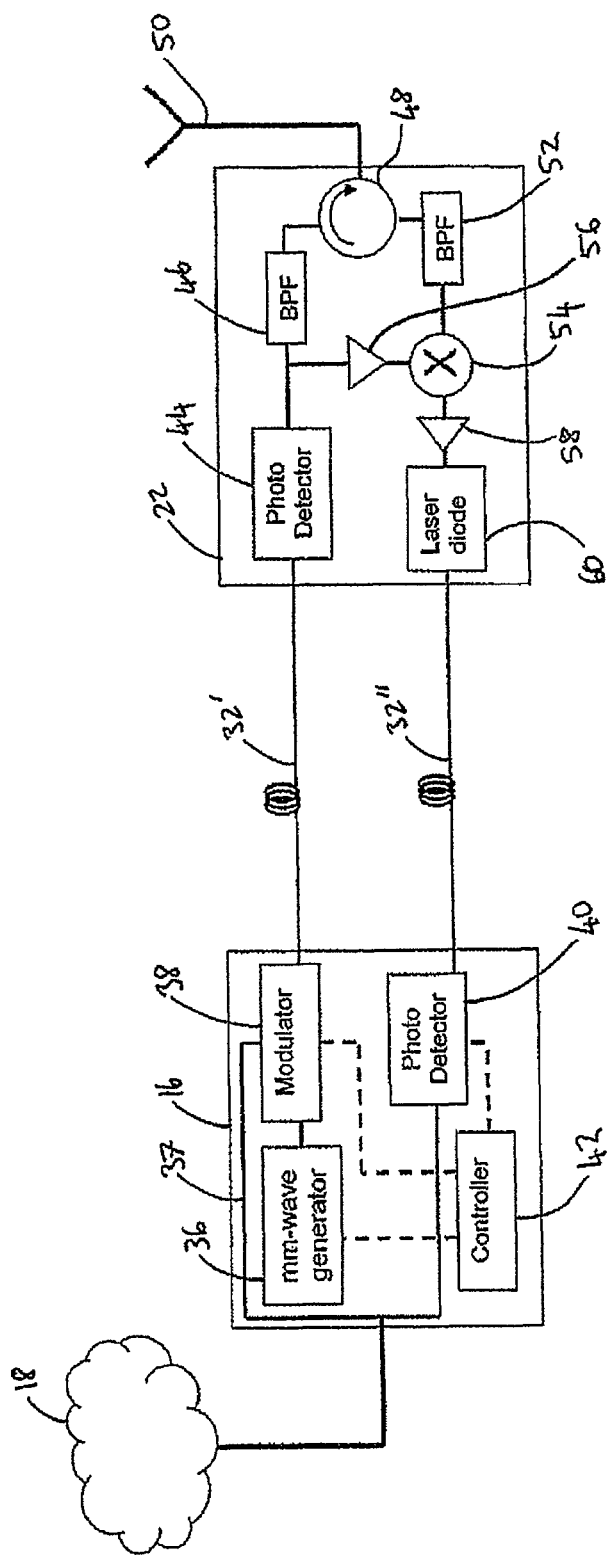
FIG. 3 is a schematic diagram of components of the communications system of FIG. 2.

In general, the components described with reference to FIG. 3 are arranged to allow for millimeter-wave radio over fibre (RoF) communication between the central station 16 and the wireless network access point 22.

FIG. 3 shows a wireless network access point 22 of a base station 12 connected to the central station 16 via optical fibre links 32' and 32". Optical fibre link 32' is typically used for communication from the central station 16 to the wireless network access point 22, while optical fibre link 32" is typically used for communication from the wireless network access point 22 to the central station 16. It will be appreciated that additional components such as the optical fibre distribution boxes 24 and the splitter 26 may be arranged between the wireless network access point 22 and the central station 16, however they have been omitted from FIG. 3 for ease of explanation.

The central station 16 comprises a millimeter-wave generator 36 arranged to generate an optical carrier signal with a wavelength in the order of millimeters. Optical carrier signals generated by the generator 36 are modulated with data signals 37 communicated from the network 18 by means of the modulator 38. The modulated signals are then communicated to the wireless network access point 22 via the optical fibre link 32'.

The central station 16 also comprises a photodetector 40 arranged to convert optical signals received via the optical fibre link 32". The central station 16 is arranged to convert optical signals received by the photodetector 40 into data signals for communication to the network 18. The generator 36, modulator 38 and photodetector 40 are controlled in an appropriate manner by means of a controller 42.

The wireless network access point 22 comprises a photodetector 44 arranged to receive modulated data signals from the central station 16 via the optical fibre link 32'. Signals received by the photodetector 44 are filtered by a band pass filter 46 before being passed through an optical circulator 48 which is arranged to send the filtered signal to an antenna 50. The antenna 50 is arranged to radiate the data signal that originated from the network 18 to an appropriately enabled communications device associated with a waiting passenger.

The waiting passenger's wireless communications device may be any appropriate device such as a mobile phone, laptop or tablet computing device with wireless networking functionality.

The antenna 50 is also arranged to receive wireless data signals from the waiting passenger's communications device, where it is then passed by the optical circulator 50 to a band pass filter 52. From here, the data signal is mixed with at least a portion of the signal that was received by the photodetector 44 by means of a mixer 54.

In this example, at least a portion of the signal received by the photodetector 44 functions as a local oscillator, and avoids the need for supplying the wireless network access point 22 with its own millimeter wave generator. For example, at least a portion of the signal received by the photodetector 44 can be filtered (not shown) so as to obtain a signal having properties based on the carrier signal generated by the generator 36. This signal can then be mixed with the wireless data signal received by the antenna 50 for transmission to the central station 16.

The at least a portion of the signal is amplified by means of an amplifier 56 before being fed to the mixer 54.

After the data signal is mixed with the signal portion, it is amplified by means of an amplifier 58 before being fed to a laser diode 60 arranged to transmit the amplified signal via the optical fibre link 32" to the central station 16.

An example base station 12 will now be described in more detail with reference to FIGS. 4 and 5.

Figure 4A:
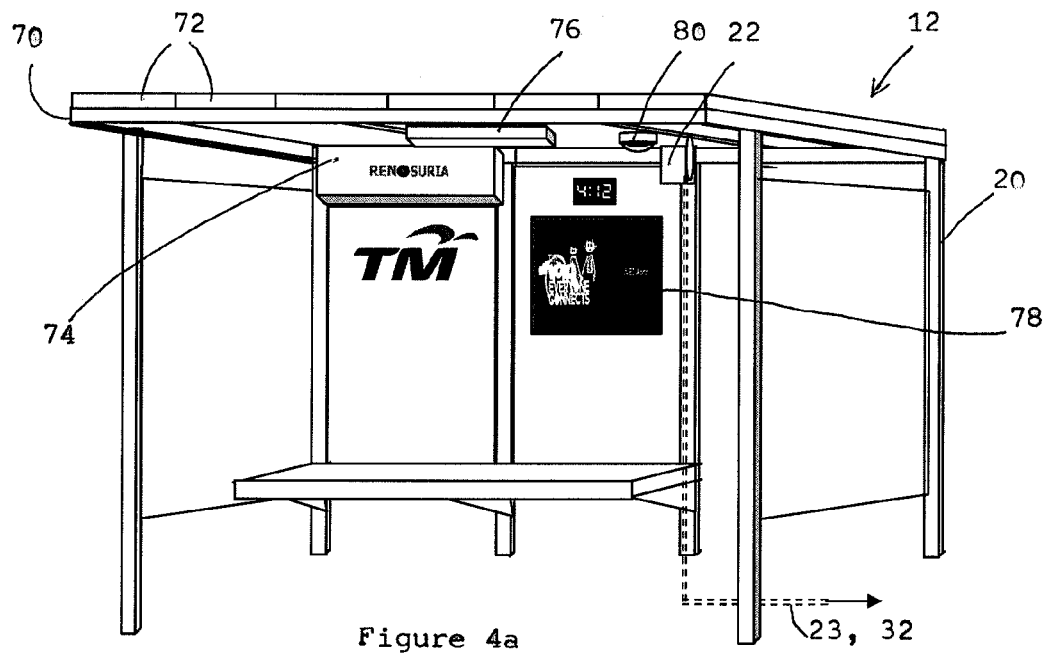
FIG. 4a is an isometric view of a base station of the communications system of FIG. 1.
Figure 4B:
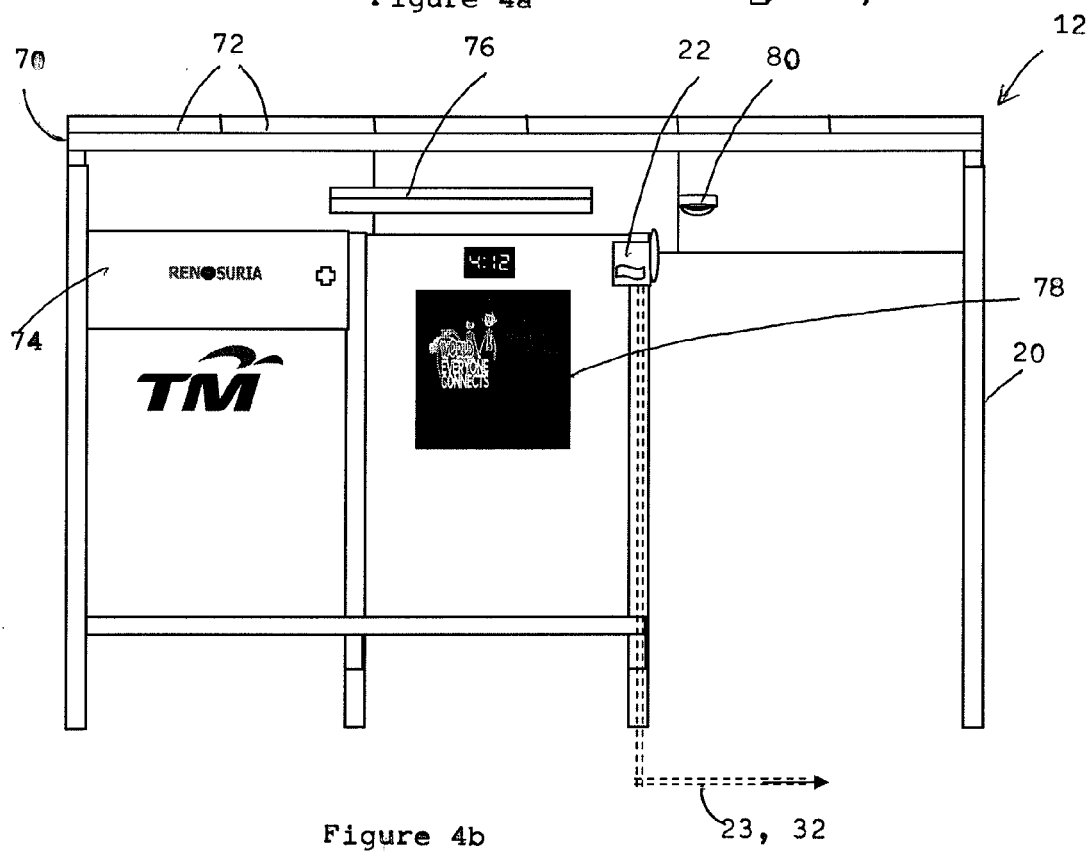
Figure 4C:
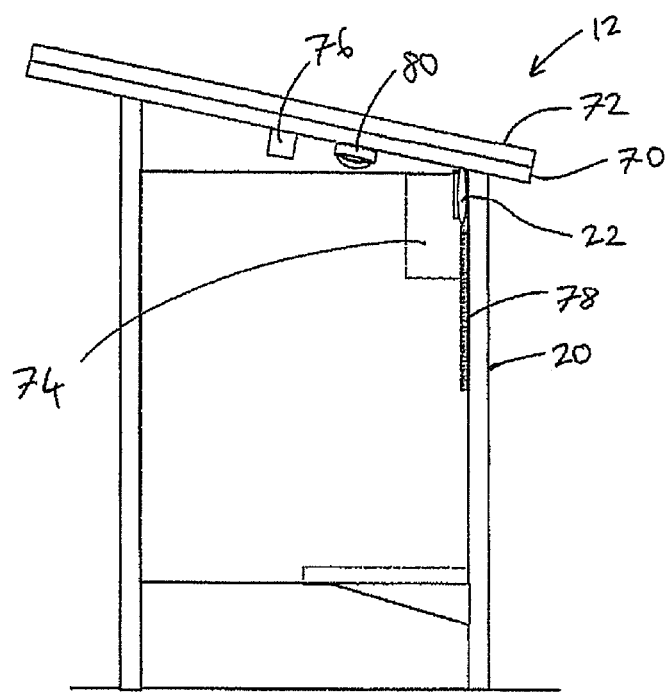
Figure 5:
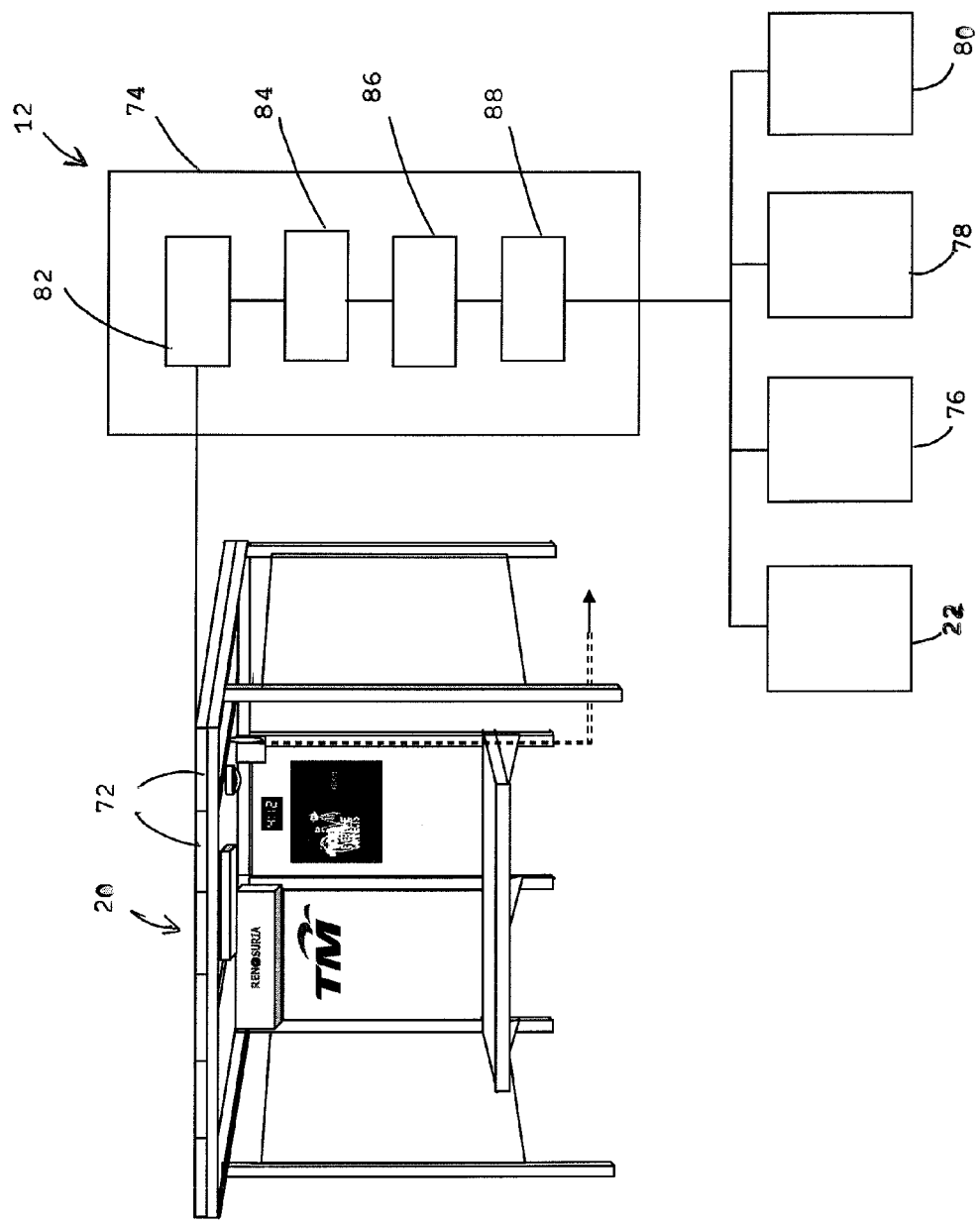
FIG. 5 is a schematic diagram of the base station of FIG. 4.

FIG. 4 shows the base station 12 comprising the shelter 20. The shelter 20 comprises a roof portion 70, with photovoltaic cells 72 being disposed on the roof portion 70. The photovoltaic cells 72 being arranged to convert solar energy into electrical energy. The base station 12 also comprises an energy distribution system 74, shown schematically in FIG. 5, arranged to receive electrical energy from the photovoltaic cells 72 and to provide the electrical energy to electrically powered components of the base station 12 such as the wireless network access point 22.

In addition to the wireless network access point 22, the base station 12 may comprise any manner and variety of electrically powered components. In general, the electrically powered components will provide some form of use, benefit, or effect for or on the awaiting passengers. For example, the base station 12 may comprise any one or more of the following:

a lighting system 76;
a display system 78;
an audio system (not shown); and
a security system 80.

The energy distribution system 74 comprises components that allow it to receive electrical energy from the photovoltaic cells 72 and to power electrical components such as those listed above. In this example, the energy distribution system 74 comprises a battery system 84 arranged to store electrical energy provided by the photovoltaic cells 72. Electrical energy received from the photovoltaic cells 72 is fed to a charge controller 82 arranged to charge the battery system 84.

The battery system 84 is connected to an inverter 86 that is arranged to convert DC electricity stored in the battery system 84 to AC electricity that is usable by the components of the base station 12. AC electricity output from the inverter 42 is then fed to an AC electrical distribution module 44 arranged to provide AC electricity to the components of the system 10.

The base station 12 is arranged such that the electrically powered components thereof can receive stored electrical energy from the battery system 84, for example at times when sunlight is not impinging on the photovoltaic cells 72.

The base station 12 is arranged to detect an amount of ambient light and to turn the lighting system 76 on if the amount of detected ambient light is below a predetermined threshold.

In one embodiment the base station 12 comprises a light detector wherein the amount of ambient light is detected using the light detector. In another embodiment, the amount of ambient light is detected by measuring an output of the photovoltaic cells 72. In this embodiment, the base station 12 is arranged such that, if the output of the photovoltaic cells 72 is below a predetermined threshold, the lighting system 76 is turned on. It will be appreciated that the energy for powering the lighting system 76 will be provided by the battery system 84 since, typically, the amount of sunlight impinging on the photovoltaic cells 72 at times when lighting is required would be insufficient to power the lighting system 76.

The display system 78 and the audio system can be arranged to operate separately or in conjunction with one another to provide information or services to passengers waiting at the shelter 20. For example, the display system 78 and the audio system can operate together as an audio-visual system to deliver advertising content to the passengers, or to provide entertainment such as television shows. Content, such as the advertising or television content, can be provided via the wireless network access point 22.

The security system 80 may comprise an appropriate security monitoring system such as a closed circuit television (CCTV) system or a security system that uses Internet protocol (IP) cameras. The security system 80 is arranged to provide security video to security and/or law enforcement personnel to assist in monitoring the safety of passengers using the shelter 20 and to deter vandalism and other acts of antisocial behavior in and around the shelter 20. The security system 80 is powered by the energy distribution system 74 and can transmit video and/or audio to the security and/or law enforcement personnel via the communications system 10.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A communications system comprising:
 a plurality of base stations, each base station comprising a shelter for a passenger awaiting transport, the shelter having a wireless network access point;
 a central station arranged to facilitate communication between each base station and a communications network; and
 a fibre optic communications network arranged to facilitate communication between each base station and the central station;
 wherein the fibre optic communications network comprises a splitter system arranged between the base stations and the central station, the splitter system being arranged to facilitate communications between respective optical fibre links that connect respective base stations to the splitter system, and at least one optical fibre link that connects the splitter system to the central station;

wherein each of the shelter of the base station comprises:
a roof portion;
photovoltaic cells disposed on the roof portion, the photovoltaic cells being arranged to convert solar energy into electrical energy; and
an energy distribution system arranged to receive electrical energy from the photovoltaic cells and to provide the electrical energy to at least one electrically powered component of the base station;
wherein the base station is arranged such that the wireless network access point is powered by the energy distribution system;
wherein the base station comprises a battery system arranged to store electrical energy converted by the photovoltaic cells;
wherein the base station is arranged such that the electrically powered components of the base station can receive stored electrical energy from the battery system;
wherein the base station comprises the following electrically powered components:
a lighting system;
a display system;
an audio system; and
a security system;
wherein the lighting system comprises at least one LED light; wherein the base station is arranged to detect an amount of ambient light and to turn the lighting system on if the amount of detected ambient light is below a predetermined threshold;
wherein the base station comprises a light detector wherein the amount of ambient, light is detected using the light detector;
wherein the amount of ambient light is detected by measuring an output of the photovoltaic cells;
wherein the base station is arranged such that, if the output of the photovoltaic cells is below a predetermined threshold, the lighting system is turned on;
wherein the security system comprises a closed circuit television system or a security system that uses Internet protocol (IP) cameras;
wherein the security system is arranged to provide security video to security and/or law enforcement personnel;
wherein the base station is arranged to provide the security video to the security and/or law enforcement personnel via the communications system;
wherein wireless network access point is millimeter wave radio frequency network access point;
wherein the communications network is the Internet, and;
wherein the wireless network access point comprises:
a photodetector receiving the modulated data, signals from the central station;
a band pass filter connecting to the photodetector;
an optical circulator sending filtered signal to an antenna;
the antenna radiating data signal that originated from the communications network to an enabled communications device associated with a waiting passenger;
a mixer in connection with and mixing signals from the photo detector and optical circulator; and
a laser diode in connection with the mixer and transmitting signals to the central station.

2. The communications system of claim 1, wherein the fibre optic communications network is arranged to facilitate radio over fibre communications between each base station and the central station.

3. The communications system of claim 1, wherein the fibre optic communications network comprises at least one fibre optic distribution system arranged between the splitter and a plurality of base stations, the fibre optic distribution system being arranged to facilitate communications between the plurality of base stations and the splitter system.

4. The communications system of claim 1, wherein at least some of the base stations are arranged along at least a portion of a transportation route.

5. The communications system of claim 4, wherein the communications system is arranged so as to allow passengers who transit along the transportation route to use the communications system at different points of the transportation route.

6. The communications system of claim 4, wherein a wireless range provided by each wireless network access point is sufficient so as to provide substantially continuous network coverage over at least a portion of the transportation route.

7. The communications system of claim 1, wherein the display system and/or the audio system are arranged to provide information or services to users of the shelter.

8. The communications system of claim 7, wherein the display system and the audio system operate in conjunction with one another to provide the information or services.

9. The communications system of claim 7, wherein content output by the display and/or audio systems is provided by the communications system.

10. The communications system of claim 7, wherein, the information or services is advertising or entertainment information or services.

* * * * *